United States Patent
Ueki et al.

[11] 3,946,430
[45] Mar. 23, 1976

[54] MULTIPLE RECORDING SYSTEM FOR VIDEO SIGNALS AND OPTICAL IMAGES

[75] Inventors: Atsufumi Ueki; Nobuo Nishida; Shinji Takahashi, all of Tokyo, Japan

[73] Assignee: Nippon Electric Co., Ltd., Tokyo, Japan

[22] Filed: June 4, 1974

[21] Appl. No.: 476,258

Related U.S. Application Data

[63] Continuation-in-part of Ser. No. 195,311, Nov. 3, 1971.

[30] Foreign Application Priority Data

Nov. 6, 1970  Japan............................... 45-97621

[52] U.S. Cl................................ 358/2; 350/162 SF
[51] Int. Cl.².......................................... H04N 9/02
[58] Field of Search................. 358/2; 179/100.3 G; 178/6.7 A; 350/3.5, 162 SF

[56] References Cited
UNITED STATES PATENTS
3,790,701   2/1974   Istavan................................ 350/3.5

*Primary Examiner*—George H. Libman
*Attorney, Agent, or Firm*—John M. Calimafde

[57] ABSTRACT

A multiplexed holographic recording system employs plural transparent positive pictures, each representing a different pictorial or video information content, which embody differing, unique pre-assigned spatial frequencies. A hologram is formed of the positive pictures, the reconstructed image from the hologram being identical in smoothed intensity distribution to a composite picture formed by superposition of the positive pictures.

Spatial frequency filters are employed to remove, from the object beams transmitted through the positive pictures driving hologram formation, spatial frequency components assigned to other pictures. Accordingly, crosstalk between the multiplexed pictorial information is obviated.

11 Claims, 30 Drawing Figures

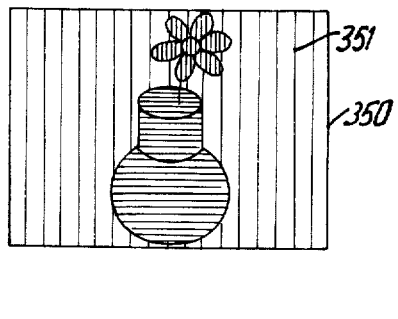
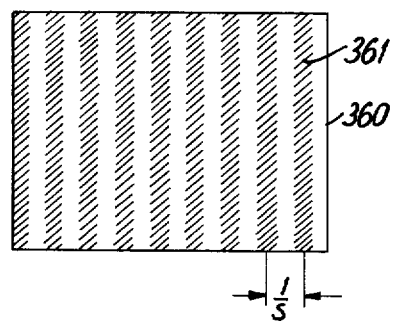
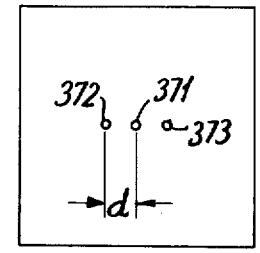
FIG.10          FIG.11          FIG.12
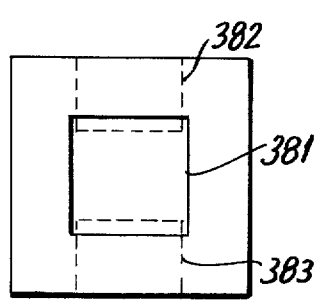
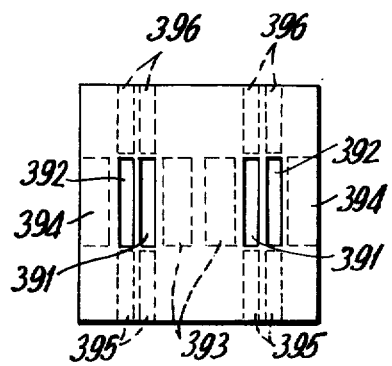
FIG.13a         FIG.13b
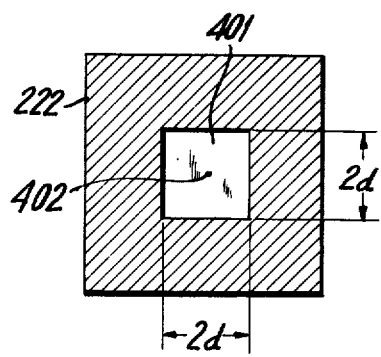
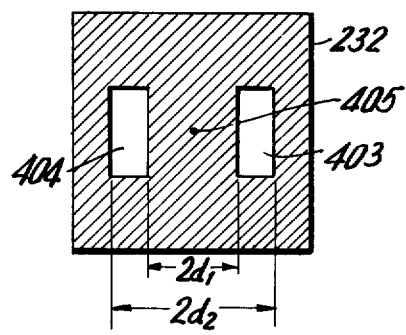
FIG.14a         FIG.14b

MULTIPLE RECORDING SYSTEM FOR VIDEO SIGNALS AND OPTICAL IMAGES

This is a continuation-in-part of our copending application Ser. No. 195,311, filed Nov. 3, 1971.

This invention relates to a video signal or optical image recording system employing holographic principles and, more particularly, to such a recording systems adapted for multiple recording.

As known to those skilled in the art, hologram recording comprises exposing an area of a recording medium, such as a photographic film, to an object beam from an object illuminated with spatially coherent electromagnetic waves, such as a laser light and simultaneously directly exposing the same area to a reference beam of the spatially coherent electromagnetic waves. This results in an interference pattern formed between the object beam and the reference beam being recorded on the given area of the recording medium. To reconstruct the image of the object from the recorded interference pattern (i.e. the hologram), the hologram is illuminated in a direction opposite to the reference beam with the same spatially coherent electromagnetic wave as used during recording. The reconstructed image is then obtained at the position occupied by the object during recording.

Holography is attractive for data recording and display applications because a hologram can be severely scratched, spotted with dirt, and even broken into pieces without causing more than a slight loss in overall resolution and contrast in the reconstructed image. Usually a slight overall degradation in the reproduced image is preferable to a complete loss of small portions of the image, which occures for conventional photographs when the recording films are scratched, spotted with dirt, broken, or the like.

From an economical standpoint, however, the hologram recording medium is rather costly because it must be of high resolution, and a larger area is required to record a hologram of an object than to record the image of the object directly in photographic form. Hologram recording in a small area causes much speckle noise in the reconstructed image. One of the best methods to overcome this difficulty without losing the preferable features of holography is the multiple recording of holograms in a single area of the recording medium.

In a conventional multiple image recording system of the holographic type, the direction of the reference beam is changed for each of plural object beams respectively modulated by objects. In the reconstruction of the recorded images by illuminating the hologram thus prepared, the reconstructed images are formed at separate spatial positions for each image. If those separate images are to be converted into video signals simultaneously, plural television cameras are needed, one for each reconstructed image. This complicates the system and makes it costly to manufacture.

To obviate this disadvantage, another method has been proposed, wherein only one optical image is reconstructed from the hologram, while the optical image is spatial frequency division multiplexed and can be converted into mutually different plural video signals using only one television camera and an electronic demultiplexing network. The SelectaVision arrangement introduced by RCA (Electronics, Nov. 10 issue, 1969, pages 108–114) is specifically based on this principle. In the SelectaVision system, three different pictures corresponding to the luminance, and red and blue component signals from a color television camera are recorded in a single image or frame on electron-sensitive film using the spatial-frequency multiplexing technique. The holographic pattern is made from the frame of the developed film using conventional holographic technique, and is finally duplicated in embossed form onto a vinyl film. The reconstructed image of the spatial-frequency multiplexed frame from this holographic pattern on the vinyl film is positioned at the photosensitive surface of a vidicon and transformed to an electrical signal, from which the three component signals are separately reproduced by the use of band pass filters and demodulators.

However, one difficulty is encountered in the SelectaVision-type recording system. Specifically, since the electron-sensitive medium recording the spatial-frequency multiplexed frame inevitably exhibits nonlinearities (gamma characteristics), crosstalk is produced between recorded pictures due to cross modulation, detracting from the quality of the reproduced pictures. The picture quality deterioration is more offensive, visually, than that of a brightness nonlinearity in a single picture. In the SelectaVision arrangement, for example, the beat component between the blue signal modulating a 3.5 MHz subcarrier and the red signal modulating a 5 MHz subcarrier, produced around 1.5 MHz by the nonlinearity, is superimposed upon the luminance signal (0–3 MHz) to greatly deteriorate the reproduced picture quality. If the nonlinear characteristics of the recording medium can be determined beforehand, crosstalk between pictures may be eliminated by compensating the picture signals with the reverse characteristic at the time of recording. However, this is very difficult to achieve in practice because such nonlinear characteristics depend on the photographic emulsion of each film lot and cannot be determined in advance. This condition inevitably occurs, no matter how severely the developing conditions are specified, as long as a conventional recording medium (silver halide film for example) is used.

It is an object of the present invention to provide apparatus for producing a holographic memory with a single reconstructed image of the spatial-frequency division-multiplexed type, which substantially eliminates cross modulation distortion otherwise causing deterioration in the quality of reproduced demultiplexed pictures.

Another object of the invention is to provide apparatus for producing a holographic memory with a single reconstructed image of the spatial-frequency division-multiplexed type, which permits the use of a recording medium having appreciable nonlinear characteristics.

It is a feature of the present invention to prepare plural transparent positive pictures having mutually different spatial frequencies from plural pictorial information inputs to be multiplexed, instead of a single spatial-frequency division-multiplexed transparent positive picture. The information from the plural positive pictures is then recorded on a hologram in multiplexed form using plural object beams passing through the respective pictures. This procedure enables one to utilize spatial-frequency filters in the paths of the respective object beams to eliminate therefrom the obstructive spurious frequency components produced by nonlinearity of the recording medium of the transparent positive pictures, which would otherwise deteriorate the quality of the pictures reproduced with television receivers from the demultiplexed picture signals reproduced from the reconstructed image of the hologram.

These and other objects, features and advantages of the present invention will become more apparent from the following detailed description, taken together with the accompanying drawing in which.

Figure 1:
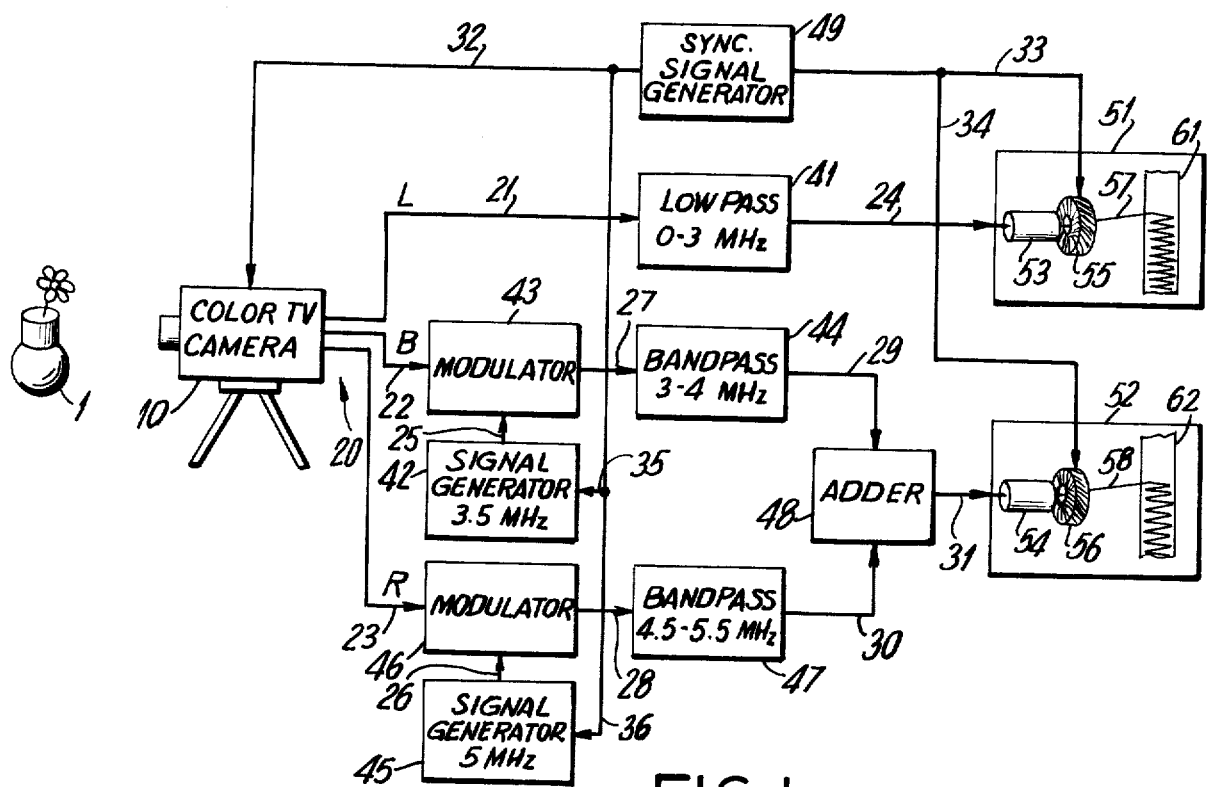
FIG. 1 is a schematic block diagram of a portion of a preferred embodiment of this invention, i.e., an arrangement for preparing transparent positive pictures from color television signals.
Figure 4A:
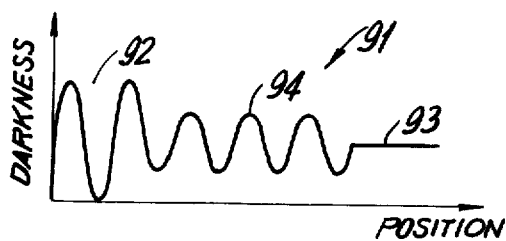
Figure 3A:
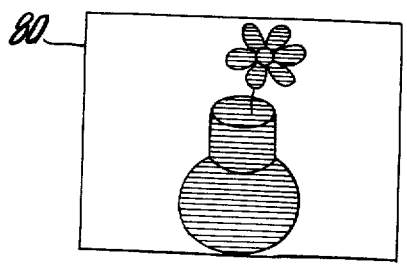
Figure 3B:
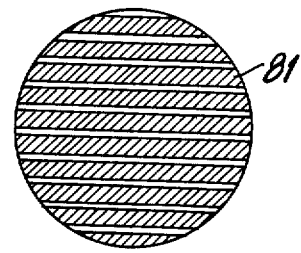
Figure 3C:
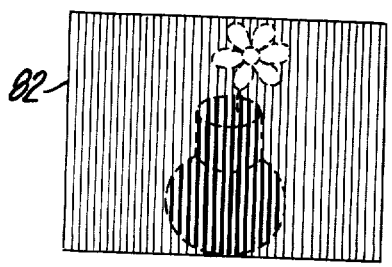
Figure 5:
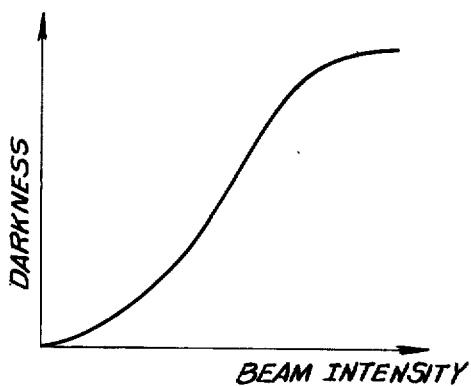
Figure 6:
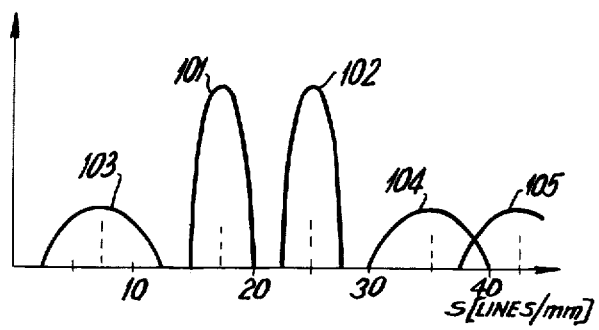
Figure 7:
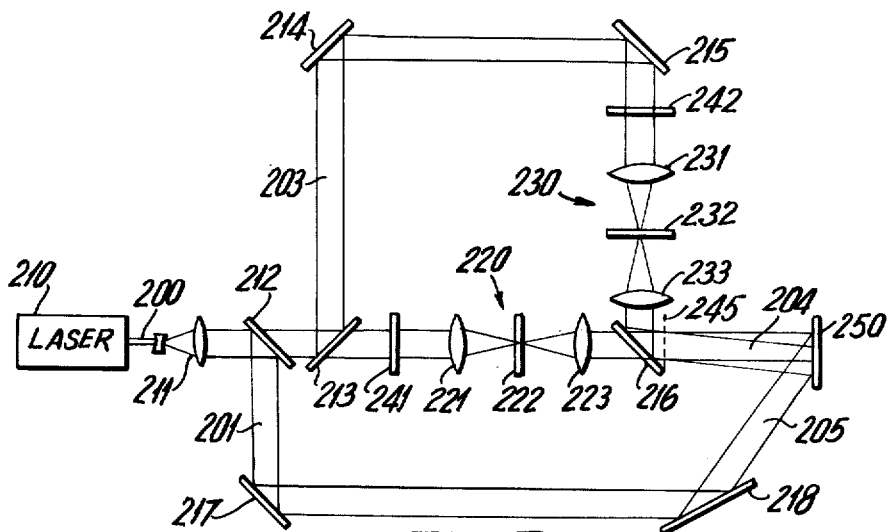
Figure 8:
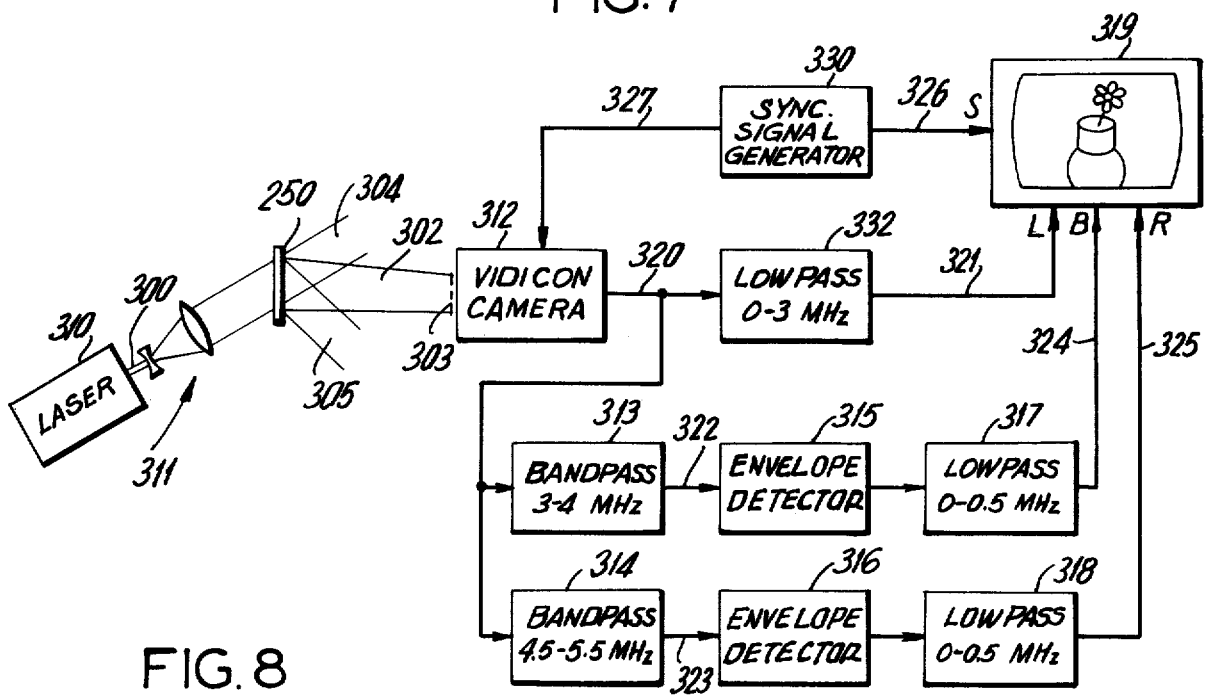
Figure 9A:
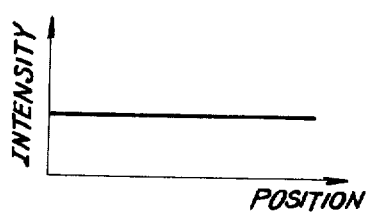
Figure 15:
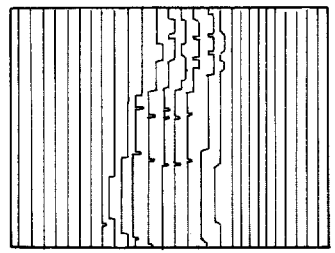
Figure 16:
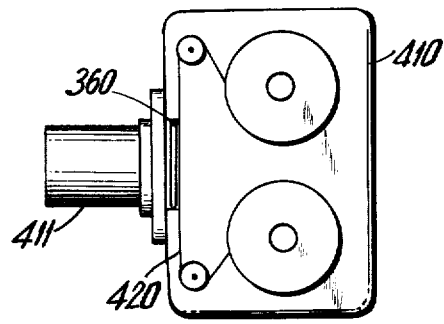
Figure 17:
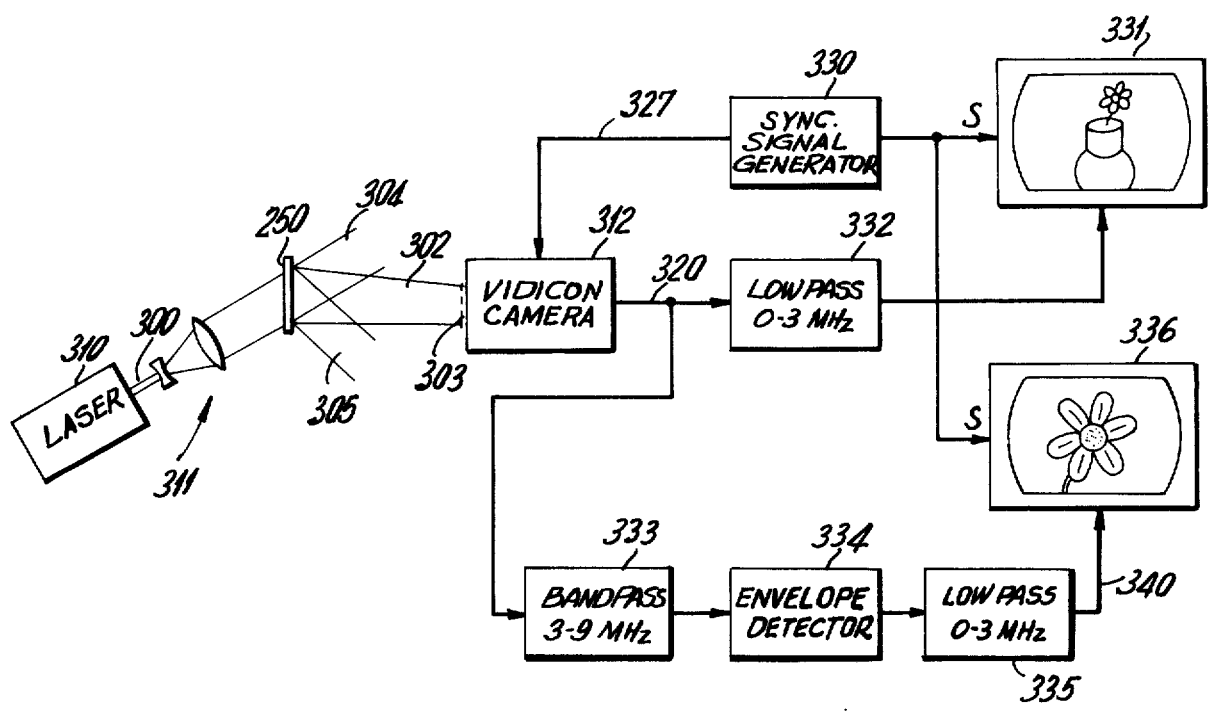

FIGS. 3a, b, c, d and e are the patterns which illustrates the nature of images recorded on the transparent positive pictures;

FIGS. 4a and b are waveform illustrating the darkness variation in FIGS. 3c and e respectively;

FIG. 5 is a graph showing the nonlinearity of a recording medium for transparent positive pictures;

FIG. 6 is a spatial frequency spectrum of a transparent positive picture illustrating the effect of nonlinearities;

FIG. 7 is a schematic block diagram of another portion of the preferred embodiment of the invention, i.e., the hologram forming apparatus;

FIG. 8 is a schematic block diagram of the play-back system for developing a full color picture from the hologram formed of the transparent positive pictures;

FIG. 9a, b, c, d, e, f, and g are waveforms which illustrate the interference effects of the object beams synthesized to make a single hologram in the embodiment of FIG. 7;

FIG. 10 is a pattern of the reproduced image in the embodiment of FIG. 8 from a hologram prepared without employing any spatial frequency filters;

FIG. 11 is a plan view of a regular patterned transparent diffraction grating shown for describing the principles of spatial frequency filters, and are used in an embodiment of FIG. 16 to convert the spatial frequency of the image;

FIG. 12 is the spectrum pattern of the regular patterned grating observed in the spatial frequency filters;

FIG. 13a and b are the spectrum patterns of the transparent positive pictures prepared in the embodiment of FIG. 1;

FIG. 14a and b are plan views of the masks used in the spatial frequency filters which corresponds to FIG. 13a and b, respectively;

FIG. 15 is a pattern illustrating the nature of the recorded image on a transparent positive picture in the embodiment of FIG. 1 where the carrier signal for frequency conversion is modulated in phase rather than amplitude;

FIG. 16 is another embodiment of a part of this invention, i.e., an arrangement for preparing transparent positive pictures having different spatial frequencies from objects or optical images; and FIG. 17 is another embodiment of the play-back system of the hologram containing two independent programs.

Referring now to FIG. 1, there is shown a preferred example of apparatus for preparing plural transparent positive pictures having mutually different spatial frequencies from plural picture informations. As is fully explained below, the plural transparent positive pictures thus prepared are employed in hologram forming structures as shown in FIG. 7, and all original picture information is reproduced from the hologram with a play-back system such as illustrated in FIG. 8.

In FIG. 1, the plural picture information signals illustratively comprise a luminance signal 21, a blue signal 22, and a red signal 23 of an electronic color television signal group 20 generated by scanning an object 1 with a color television camera 10. If a green signal is supplied from the camera 10 instead of the luminance signal, the luminance signal can be developed by linearly summing the green, blue and red signals. The luminance signal 21 passes through a low pass filter 41 having a passband of 0 to 3 MHz and is supplied to a first electron beam recorder 51. The blue signal 22 is supplied to an amplitude modulator 43 and modulates the amplitude of a 3.5 MHz carrier signal 25 generated by a signal generator 42. Similarly, the red signal 23 is supplied to another amplitude modulator 46 and modulates a 5 MHz carrier signal 26 from another signal generator 45. The frequency converted blue signal 27 and red signal 28 pass through bandpass filters 44 and 47 having pass bands of 3 to 4 MHz and 4.5 to 5.5 MHz, respectively, and are added with each other in the adder 48 to be supplied to a second electron beam recorder 52.

The outputs 24 and 31 of the lowpass filter 41 and the adder 48 respectively modulate the intensity of electron beams 57 and 58 emitted into vacuums by electron guns 53 and 54 in the electron beam recorders 51 and 52. The intensity modulated electron beams 57 and 58 are deflected by deflecting coils 55 and 56 respectively, in accordance with synchronizing signals 33 and 34 supplied by a synchronizing signal generator 49, and reach electron-sensitive films 61 and 62 (e.g. 16 mm wide), which react to beam intensity the same way a photographic film reacts to light. As the synchronizing signal 32 is supplied to the color television camera 10 from the same synchronizing signal generator 49, the films 61 and 62 are scanned in a raster pattern and the electron beams 57 and 58 record the information signals characterizing the object 1 on the films 61 and 62, respectively, in the form of a two-dimensional pattern, where the positional relation among all parts of the object 1 is preserved in a perspective sense.

Figure 2:
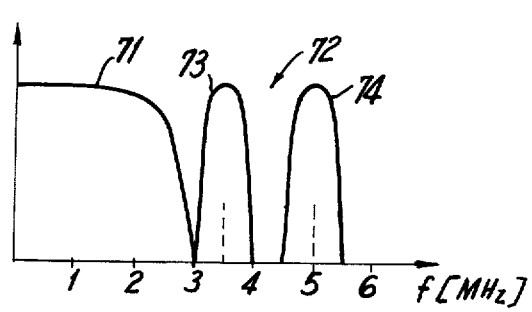
FIG. 2 is a graph showing the frequency spectra of the electrical signals to be recorded in transparent positive pictures in the embodiment of FIG. 1.

FIG. 2 shows the frequency spectra 71 and 72 of the signals 24 and 31 supplied to the electron beam recorders 51 and 52 respectively. The luminance spectrum 71 extends up to 3 MHz, while the chrominance spectrum 72 is disposed above 3 MHz and is composed of the blue spectrum 73 distributed about 3.5 MHz (the band passed signal 29) and the red spectrum 74 centered about 5 MHz (the signal 30). It is to be noted here that the blue and red spectra 73 and 74 should not overlap to prevent crosstalk between the reproduced blue and red signals, but crosstalk due to the overlapping of the luminance spectrum 71 and the chrominance spectrum 72 may be avoided by the use of spatial frequency filters in the hologram forming apparatus of the present invention as fully explained below.

FIG. 3a shows in a simplified form an image 80 of the object 1 recorded on the electron-sensitive film 61 and processed into the form of a transparent positive picture by development. As the recording is made with the electron beam 57 scanning the film 61 in a raster pattern, the image 80 is formed of many fine horizontal stripes 81 of modulated darkness intensity as shown in FIG. 3b, which is an enlargement of a part of the image 80. To obscure these fine stripes, the electron beam may be made thick, or may slightly quiver rapidly in the vertical direction, but it is very difficult to eliminate the stripe effect completely.

Since the horizontal scanning speed of the electron beam 57 is maintained constant, the frequency (time) in the electrical signal 24 modulating the electron beam 57 is proportional to the frequency in the recorded image 80. If the spatial frequency of 5 lines/mm is set to correspond to a time-frequency of 1 MHz (i.e., the electron beam 57 scans 0.2 mm of the film 61 in 1 micro-second), for example, the width and height of the image 80 becomes about 12 mm and 9 mm respectively, and the spatial frequency, in the vertical direction, of the horizontal stripes 81 is about 30 lines/mm, i.e., the distance between stripes is around 30 microns.

Figure 3D:
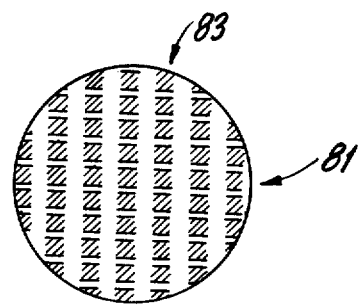

The relation between time-frequency and spatial frequency is the same for recording of the chrominance signal 31. The recorded image on the film 62 is rather complicated because of the frequency conversion and addition of the two signals 22 and 23, so that the features of the image will be illustrated with two figures (FIG. 3c and e) showing the components of the image. In FIG. 3c, there is shown the simplified image 82 recorded by the electron beam 58 on the film 62 when the frequency converted blue signal 29 is applied to the electron gun 54 directly. Since the carrier frequency of the blue signal 29 is set at an integral multiple of the horizontal scanning frequency of the electron beam 58 and synchronized to it with the signal 35 from the synchronous signal generator 49 to the signal generator 42, the recorded image 82 takes the form of intensity modulated vertical stripes 83 of a spatial frequency of 17.5 lines/mm corresponding to the carrier frequency of 3.5 MHz, superimposed on the aforementioned horizontal stripes 81, as shown in FIG. 3d in a partially enlarged form. With respect to the electron beam recorder and the vertical stripes in the recorded image, a detailed explanation may be found in the "IEEE Spectrum", September 1970 issue, at pages 22–33. FIG. 4a shows a waveform 91 representing the darkness variation of the recorded image 82 of the blue signal 29 along a horizontal line. In FIG. 4a, the signal links 92, 93 and 94 correspond to full blue, no blue, and partial blue components in the object 1, respectively.

Figure 4B:
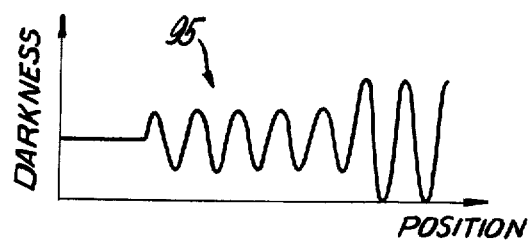
Figure 3E:
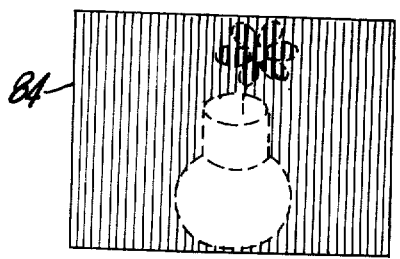

FIG. 3e is a simplified image 84 recorded when the frequency converted red signal 30 is directly applied to the electron gun 54. The image 84 also has intensity modulated vertical stripes, and their spatial frequency is 25 lines/mm corresponding to the carrier frequency of 5 MHz. FIG. 4b depicts a waveform 95 similar to that of FIG. 4a but corresponding to the recorded image 84 of the red signal 30.

The image actually recorded via the sum chrominance signal 31 and the electron beam recorder 52, and processed into a transparent positive picture, is the super position of the recorded images 82 and 84. The darkness variation in the actual image, however, is different from the linear superposition of the waveforms 91 and 95 in FIG. 4a and b by virtue of nonlinearities in the recording medium 62. FIG. 5 shows the nonlinearity of a recording medium which converts the electron beam intensity to intensity (light-darkness) modulation.

The spatial frequency spectrum of the actual image is shown in FIG. 6. The most obstructive spatial-frequency component produced by the nonlinearity is the beat component 103 around 7.5 lines/mm (corresponding to 1.5 MHz) between the blue spectrum 101 disposed about 17.5 lines/mm and the red spectrum 102 around 25 lines/mm. The recording medium nonlinearity also produces other obstructive components around 35 lines/mm (second harmonic of the blue spectrum 104), 42.5 lines/mm (sum component 105 of the blue and red spectra), and so forth. The luminance image 80 also contains distortion components on account of the nonlinearities some of which exceed the assigned spatial-frequency region up to 15 lines/mm (corresponding to 3 MHz).

In the embodiment of FIG. 1, the color television signal group 20 may be supplied by a color video tape recorder, which can reproduce a signal previously recorded from a color television camera or the like. In this case the synchronizing signals 33, 34, 35, 36 for electron beam scanning and carrier synchronization should also be supplied by the video tape recorder. By the use of a color video tape recorder as the color signal source, a single electron beam recorder 51 can record both the luminance signal 24 and the chrominance signal 31 by playing back the tape recorder twice and switching the input signal to the electron beam recorder 51 from the luminance signal 24 to the chrominance signal 31 on the second pass.

FIG. 7 is a schematic block diagram of a preferred embodiment of apparatus for generating holograms from the transparent positive pictures prepared with apparatus such as that shown in FIG. 1. The output beam 200 from a laser light source 210 is magnified and converted into a parallel beam by the beam magnifying optical system 211, and is separated into the beams 201, 202 and 203 by semi-transparent mirrors 212 and 213. The beam 202 is transmitted through a transparent positive picture 241 directly, while the beam 203 is transmitted through a transparent positive picture 242 after being reflected by reflectors 214 and 215. The two beams are synthesized (combined) at the semi-transparent mirror 216 after the crosstalk components thereof have been eliminated by spatial frequency filters 220 and 230. The synthesis is performed so that the light rays transmitted through spatial frequency filters 220 and 230 may form aerial images of transparent positive pictures 241 and 242 at the same position 245. Further, the two beams are to be synthesized at an angle, which will be fully discussed below. The light beams from this synthesized aerial image become the object beams for producing the hologram while the beam 201 reflected by reflectors 217 and 218 becomes a reference beam 205, with the resulting hologram being produced on a photographic recording medium 250. It is to be noted here that the two object beams may be recorded on the hologram at different times, if the reference beam is supplied at both such times.

When the transparent positive pictures 241 and 242 represent the luminance and chrominance signals from an object, the coincidence of the aerial images at the position 245 should be closely maintained as can be seen from the discussion below with respect to the play-back system. Interlocking the film feeding mechanisms, and recording the two pictures 241 and 242 on the respective halves of a film, are useful for this purpose.

FIG. 8 shows a play-back system to reconstitute a full color picture from the hologram made with apparatus such as shown in FIG. 7 from plural transparent positive pictures representing luminance and chrominance signals discriptive of an object. The output beam 300 from a laser light source 310 is magnified and converted into a parallel beam by an optical system 311, and illuminates the hologram 250 after its development in a direction opposed to the reference beam 205 utilized during hologram formation. The first-order diffraction light 302 diffracted by the hologram 250 reconstructs a real image 303 at a position, with respect to the hologram 250, where the synthesized image 245 was present when the hologram was made.

The photocathode of a vidicon camera 312 is disposed at the position of the reconstructed real image 303. The image, which represents the luminance and chrominance signals 24 and 31 in spatial-frequency division-multiplexed form is converted into a frequency division-multiplexed electrical signal 320 at the output of the vidicon camera 312. The multiplexed signal 320 is then divided into the luminance signal 321, the frequency-converted blue signal 322, and the frequency-converted red signal 323 via a low pass filter 332 and band pass filters 313 and 314, respectively. The frequency converted signals 322 and 323 are supplied to envelope detectors 315 and 316, respectively (the demodulators for the amplitude modulated signals), and demodulated to baseband blue and red signals 324 and 325, respectively, with the coaction of low pass filters 317 and 318.

The demultiplexed luminance, blue and red signals 321, 324 and 325, respectively, are applied to a color television receiver 319 with the synchronizing signal 326 from a synchronizing signal generator 330. The generator 330 also supplies the synchronizing signal 327 to the vidicon camera, and thus the color television receiver 319 reproduces the full color image of the object. As is known in the art, a bandwidth of 3MHz and 0.5 MHz for the luminance and chrominance (blue and red) signals, respectively, is typically sufficient to maintain the quality of a reproduced full color image.

In FIG. 7, the two beams from the spatial frequency filters 220 and 230 are synthesized at an angle. The reason is as follows. In the embodiment of FIG. 8, the hologram 250 reproduces the real image 303 which is the same as the aerial synthesized image 245 in FIG. 7, and the vidicon camera 312 converts the resulting light intensity into electrical current. Thus the aerial synthesized image 245 in FIG. 7 should have an intensity distribution which is equal to the sum of the brightness (or darkness) distribution of the transparent positive pictures 241 and 242 for the satisfactory reproduction of the color image of the object.

The synthesis of the images, however, is done by the amplitude of the spatially coherent electromagnetic waves (this is the so-called interference), and if the two beams are set parallel to each other, the intensity distribution of the synthesized image 245 becomes very different from the sum of the brightness distribution of the transparent positive pictures 241 and 242 under the influence of the optical phase deviation caused by the nonuniformity of the thickness of the transparent positive pictures 241 and 242.

Figure 9D:
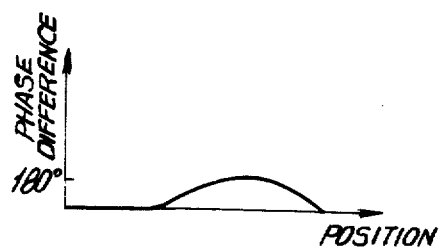
Figure 9B:
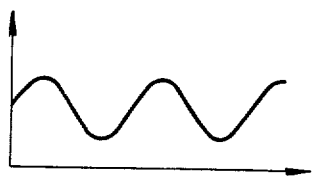
Figure 9C:
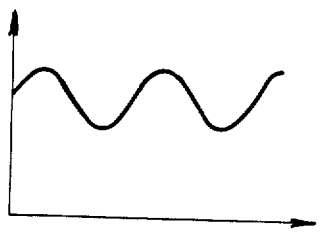

FIG. 9a, b, c, d and e clearly illustrate this interference effect. When two beams having intensity distributions such as shown in FIGS. 9a and 9b are synthesized without interference as in the case of beams of orthogonal polarization, the resultant intensity distribution is the sum of the intensity distributions of the two beams as shown in FIG. 9c. However, when interference occurs as in the present case, the resultant intensity may be too large or too small, and varies with phase difference between the two beams. Let the phase difference distribution be as shown in FIG. 9d; then the resultant intensity distribution becomes as in FIG. 9e.

Figure 9F:
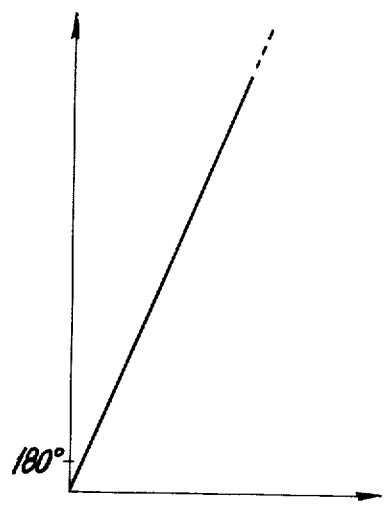
Figure 9E:
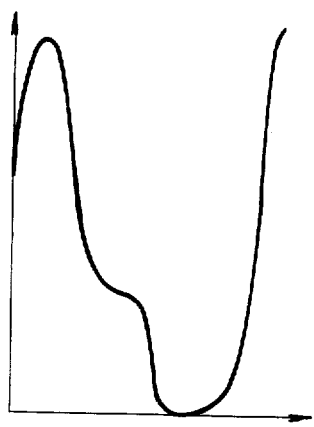
Figure 9G:
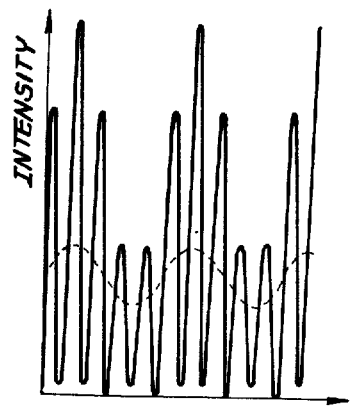

The best way to eliminate this interference effect and obtain the sum intensity distribution in practical manner is to change the phase difference very abruptly by synthesizing the two beams at an angle or by employing finely diffusing glass plates at the position of the images before the light rays from the images are combined. FIG. 9f shows the abrupt change of the phase difference between two beams having an angle between their beam axes, and the resultant intensity distribution (FIG. 9g) coincides with that in FIG. 9c if the high spatial-frequency change is smoothed out. It is to be noted here that the phase difference caused by the nonuniformity of the thickness of the transparent positive pictures cannot affect the smoothed resultant distribution, for the difference is too small compared with that caused by the inclination of the beams.

The angle $\theta$ between the two beams is determined by the light wavelength $\lambda$ and the spatial frequency $S$ of the interference pattern as $$\theta \cong \lambda S \qquad (1)$$

If $\lambda = 0.5$ $\mu$m and $S$ is selected to be sufficiently large such as 50 lines/mm, the angle $\theta$ is 0.025 radians or 1.4°. These high spatial-frequency components cannot be converted into an electrical signal by the vidicon camera 312 in FIG. 8 because of its resolution limits and, even if it were possible, the converted electrical signal would be filtered out by the filters 332, 313 and 314.

FIG. 10 generally shows the form of the reproduced image 350 of the original object 1 on the picture tube of the color television receiver 319 on FIG. 8 derived from the hologram 250 when no spatial frequency filters are employed. The vertical stripes 351 corresponding to the beat component 103 in FIG. 6 are not present in the original object, and are very offensive visually. This is a kind of crosstalk, which comes from the frequency converted chrominance signals and the luminance signals. In the SelectaVision type recording system, the crosstalk components are superposed on the spatial-frequency multiplexed image as soon as it is recorded on the electron-sensitive film, and there is no chance to utilize optical filtering techniques to eliminate the crosstalk, if the crosstalk component falls in the same spatial frequency region with the multiplexed image. It is to be noted here that the preparation of plural transparent positive pictures and their multiple holographic recording are essential to eliminate crosstalk between images.

The principle of spatial frequency filters 220 and 230 in FIG. 7 is well known, and its elementary explanation may be found, for example, in Chapter 9 of "Modern Optics" by Brown, Reinhold Publishing Corporation and in paper by Lendaris et al. in "Proceedings of the IEEE", February issue, 1970, pp. 198–216, the disclosures of which are incorporated herein by reference. The filter 220 (230) includes lenses 221(231) and 223 (233) and a mask 222(232). The mask 222(232) is placed at the rear focal plane of the lens 221(231), while the lens 223(233) is positioned so that its forward focal plane coincides with the position of the mask 222(232). In this configuration, the image of the object positioned at the forward focal plane of the lens 221(231) is provided at the rear focal plane of the lens 223(233) with a magnification factor of one, if the focal lengths of the lenses 221(231) and 223(233) are equal to each other.

If a regularly patterned transparent diffraction grating 360 as shown in FIG. 11, having a sinusoidal darkness variation in the horizontal direction with a spatial frequency of S, is placed at the forward focal plane of lens 221(231), a part of the incident laser beam passes right through the diffraction grating (zero-order diffraction light). However, a part of the beam is diffracted (first-order diffraction light). The diffraction angle $\theta$ is expressed in terms of the wave length of the incident light as $$\theta \cong \sin^{-1}\lambda S \cong \lambda S \qquad (2)$$

The foci 372 and 373 shown in FIG. 12 for the first-order diffraction light by the lens 221(231) on its rear focal plane are separated by the following distance $d$ from the focal point 371 of the zero-order diffraction light:

$$d = f_1 \tan \theta = f_1 \tan(\sin^{-1}\lambda S) \cong f_1 \lambda S, \qquad (3)$$

where $f_1$ is the focal length of the lens 221(231). The first-order diffraction light is deflected in the horizontal direction perpendicular to the stripes 361 of the diffraction grating 360. As is apparent from equation (3), the distance $d$ at the rear focal plane of the lens 221(231) is an increasing function of spatial frequency $S$ and moreover, it is approximately in linear proportion to $S$ (this transformation exactly corresponds to the Fourier transform). Since the relation between distance $d$ and spatial frequency $S$ is valid for any pictures to be placed at the forward focal plane of lens 221(231), in place of a diffraction grating, 360, it is possible to select only the desired spatial frequency components by either passing or intercepting the light depending on this distance $d$ with the mask 222(232) placed at the rear focal plane of lens 221(231).

FIG. 13a shows the light intensity distribution on the rear focal plane of the lens 221 when the transparent positive picture 80 in FIG. 3a representing the luminance signal 24 in FIG. 1 is placed at the forward focal plane of the lens 221. The center portion 381 represents the original luminance signal 24 and the distortion components produced by the nonlinearity of the electron-sensitive film 61, while the other two portions 382 and 383 are caused by the fine horizontal stripes 81 in FIG. 3b produced by the electron beam scanning.

To eliminate the effect of the horizontal stripes 81 which may significantly deteriorate the reproduced image on the color television receiver 319 if the vidicon camera 312 scans on a line between two horizontal stripes 81, and the effect of the distortion components on the chrominance signals 324 and 325 in FIG. 8, a mask 222 of the two-dimensional form as shown in FIG. 14a is preferred. When the focal length $f_1$ of the lens 221 is 100 mm and the light wavelength $\lambda$ is 0.5 $\mu$m, the height and width of the center transparent portion 401 of the mask 222 should be $$2d \cong 2f_1 \lambda S = 1.5 \text{ mm}$$

where $S$ = 15 lines/mm (corresponding to 3 MHz). Using this mask height, the effect of the horizontal stripe 81 having a spatial frequency about 30 lines/mm can also be completely eliminated. Of course, the center 402 of the transparent portion 401 must be made coaxial with the optical axis of the beam 202 and the lens 221.

In FIG. 13b, there is shown the light intensity distribution on the rear focal plane of the lens 231 ($f_2$ = 100 mm) when the transparent positive picture representing the multiplexed chrominance signal 31 in FIG. 1 is positioned at the forward focal plane of the lens 231. The portions 391 and 392 correspond to the frequency converted blue and red signals 29 and 30, respectively, while the portions 393 and 394 are the distortion components discussed previously with reference to FIG. 6. The portions 395, 396 and so on are caused by the horizontal scanning stripes 81 as in FIG. 13a.

FIG. 14b depicts a two-dimensional mask 232 for eliminating the various obstructive components from the light transmitted for the transparent positive picture representing the multiplexed chrominance signal 31. Two transparent portions 403 and 404 are arranged symmetrically with respect to the mask center 405. The height of the transparent portions may be the same as the mask 222 shown in FIG. 14a to eliminate the horizontal scanning stripes 81. In the horizontal direction, the central portion of light transmission is blocked with the width of $$2d_1 \cong 2f_2 \lambda S_1 = 1.5 \text{ mm} \; (s_1 = 15 \text{ lines/mm}),$$

and the width of the transparent portions 403 and 404 is set to be $$d_2 - d_1 \cong f_2 \lambda (S_2 - S_1) = 0.625 \text{ mm} (S_2 = 27.5 \text{ lines/mm})$$

to pass only the desired chrominance information. Fine masks of this accuracy can be obtained by photographic techniques.

As is explained in detail, the spatial frequency filters 220 and 230 eliminate the various obstructive components produced by nonlinearities of the electron-sensitive films and the like, and presents at the position 245 a pure image of spatial-frequency division-multiplexed form having no crosstalk. This pure image is recorded in the hologram 250, and then converted into electrical signal by a vidicon or, in more general terms, any image pick-up device. In these processes, however, the crosstalk caused by nonlinear distortion can be avoided as below explained.

The nonlinear characteristics of the hologram recording medium may generate second and higher order diffraction components and may attenuate the first-order diffraction component which reconstructs the desired image. It will hardly cause higher harmonic and cross modulation distortion within the reconstructed image, however, because those higher-order diffraction components are diffracted in other directions, and cannot be superimposed on the desired image. In FIG. 8, there is shown the second-order diffraction component 305, together with the zero and first-order components 304 and 302. This very nature of the absence of distortion in holographic recording system is utilized in the present invention to prevent crosstalk between recorded images.

The image pick-up devices also have the nonlinear characteristics and may produce crosstalk components. However, the performance characteristics are fixed for each device, and can be compensated with electronical circuitry.

In the embodiment of FIG. 1, the amplitude modulators 43 and 46 may be replaced by phase modulators. In this case, however, the vertical stripes explained with respect to FIG. 3c are modulated in position as shown in FIG. 15, instead of in intensity. To play back the hologram prepared from the position modulated transparent positive pictures, the envelope detectors 315 and 316 are replaced by phase detectors.

FIG. 16 shows another embodiment of the structure for preparing plural transparent positive pictures having mutually different spatial frequencies from plural picture information. Two 16 mm photographic movie cameras as shown in FIG. 16 are used to prepare plural transparent positive pictures from objects or optical images. One of the cameras is a standard, usual one while, in the other camera 410, a regular patterned transparent grating 360 (as in FIG. 11) having a sinusoidal darkness variation in the horizontal direction with a spatial frequency of 30 lines/mm is placed adjacent the film 420 so that the light from the lens 411 will pass through the grating 360 on the way to the film 420. In this manner, the image recorded on the film 420 becomes spatially frequency converted.

The second camera 410 may record program material related to the incident to the first camera such as an enlarged portion or a hidden part of the object which the first camera is recording. On the other hand, the second camera may record sequential or unrelated program material, in which case a single camera 410 can be used by alternatively attaching and removing the grating 360. The multiple recording of unrelated programs is useful economically. The aforementioned programs are defined to be "independent", because they are not useful if combined in a single superposed image. It is to be noted here that independent black and white television signals can be recorded in the form of positive pictures following the methods by which the luminance signal 21 and the blue signal 22 are recorded in the embodiment of FIG. 1 and illustrated with FIG. 3a and c.

After being developed, two transparent positive pictures recording two related or unrelated programs are employed to make a hologram as shown in FIG. 7. The passbands of the spatial frequency filters are up to 15 lines/mm for the usual image and 15 to 45 lines/mm for the spatial frequency converted image. Though the latter has such low spatial-frequency components as were present in the original image and are produced by the nonlinearities of the recording medium, these can be eliminated with the spatial filter as well as the high spatial-frequency component produced by nonlinearities in the other optical path before being recorded in the hologram.

FIG. 17 shows another embodiment of a play-back system for the hologram, which is used for the reproduction of plural independent programs. The optical system is the same as the embodiment of FIG. 8. The output 320 of the vidicon camera 312 passes through a lowpass filter 332 and is supplied to a black and white television receiver 331 which reproduces the image recorded with the usual camera. The output 320 of the vidicon camera 312 is also successively supplied to the bandpass filter 333, the envelope detector 334 and the lowpass filter 335, and the demodulated signal 340 is applied to a second black and white television receiver 336 which reproduces the image recorded in spatial frequency converted form. If the programs are sequential or unrelated, a single television receiver in combination with a switching circuit is usually sufficient to see either program.

The above-described arrangement is merely illustrative of the principles of the present invention. Numerous modifications thereof will be readily apparent to those skilled in the art without departing from the spirit and scope of the present invention.

What is claimed is:

1. A multiple image recording system comprising: a plurality of pictorial information sources; means for forming a plurality of transparent positive pictures from said plurality of pictorial information sources by converting the information into mutually different spatial frequency regions preassigned to the respective positive pictures; and means for forming a hologram from said positive pictures so that the image reconstructed from said hologram is identical, in intensity distribution smoothed by filtering out spatial frequency components higher than any of said spatial frequency regions, to a composite picture formed by mutual superposition of the positive pictures; and spatial frequency filters disposed between said transparent positive pictures and the hologram forming medium during hologram formation for removing from the light beam transmitted through each positive picture such spatial frequency components as may fall in the spatial frequency region assigned to the other transparent positive pictures, before recording in the hologram.

2. A combination as in claim 1, wherein said plurality of pictorial information source are television signals, and said means for forming transparent positive pictures comprises a modulator for frequency converting said television signals, an electron beam recorder, and a recording medium sensitive to electron beams.

3. A combination as in claim 2, wherein said plurality of television signals comprise luminance, blue and red signals of a color television signal group, said transparent positive pictures forming means includes means for forming a spatial-frequency multiplexed picture from said blue and red signals after frequency conversion and multiplexing thereof, and means for forming another transparent positive picture prepared from said luminance signal without frequency conversion.

4. A combination as in claim 2, wherein said plurality of television signals comprise two independent black and white television signals, and one of said transparent positive pictures is formed from one of said television signals after frequency conversion, while the other transparent positive picture is formed from the other television signal without frequency conversion.

5. A combination as in claim 1, wherein said plurality of pictorial information sources comprise means for supplying two optical images, one of said transparent positive pictures being prepared from one of said optical images with a photographic camera film receiving said optical image through a regular patterned transparent grating, the other transparent positive pictures being prepared from the other optical image with a photographic camera and film without a grating.

6. A combination as in claim 1, wherein said hologram forming means comprises means for supplying object light beams through said positive transparent pictures, the optical paths for the wavefronts of said object beams passing through said transparent positive pictures in said hologram preparing means differing from one another so that the spatial frequency of the interference pattern formed between reconstructed images of said positive pictures is made higher than any of said spatial frequency regions assigned to said respective positive pictures.

7. A combination as in claim 1, wherein said spatial filter comprises a lens and a two-dimensional mask positioned at the rear focal point of said lens for limiting the spatial frequency pass band in two directions orthogonal to each other.

8. In combination in a multiple image recording system, a plurality of transparent positive pictures each having information rendered therein in distinct relative spatial frequency regions, hologram recording means, means for supplying separate coherent light beams through each of said positive pictures to said hologram recording means, means for supplying a reference coherent light beam to said hologram recording means, and spatial frequency filter means optically disposed intermediate at least one of said positive pictures and said hologram recording means to eliminate distortion of said information.

9. In combination in a multiple image recording system, a plurality of transparent positive pictures each having information rendered therein in distinct relative spatial positions, hologram recording means, means for supplying separate coherent light beams through each of said positive pictures to said hologram recording means, means for supplying a reference coherent light beam to said hologram recording means, and optical filter means optically disposed intermediate at least one of said positive pictures and said hologram recording means, further comprising means for generating said positive pictures, said picture generating means comprising an electron sensitive film, an electron beam source, means for sweeping said electron beam supplied by said source thereof across said electron beam sensitive film, a frequency band limited source of information to be recorded, and heterodyne means for shifting said band limited information source in frequency and modulating the intensity of the electron beam supplied by said source thereof with said frequency modulated signal.

10. A combination as in claim 9, wherein said optical filter includes a light transmitting portion surrounded by a light transmission blocking portion.

11. A combination as in claim 9, wherein the center frequency of said frequency shifted information is an integral multiple of the film scanning frequency.

* * * * *

UNITED STATES PATENT OFFICE
CERTIFICATE OF CORRECTION

Patent No. 3946430          Dated March 29, 1976

Inventor(s) Ueki, Atsufumi; Nishida, Nobuo; and Takahashi, Shinji

It is certified that error appears in the above-identified patent and that said Letters Patent are hereby corrected as shown below:

Claim 5, line 55

After "camera" insert -- and --

Signed and Sealed this eighteenth Day of May 1976

[SEAL]

Attest:

RUTH C. MASON
*Attesting Officer*

C. MARSHALL DANN
*Commissioner of Patents and Trademarks*